UNITED STATES PATENT OFFICE 2,484,266

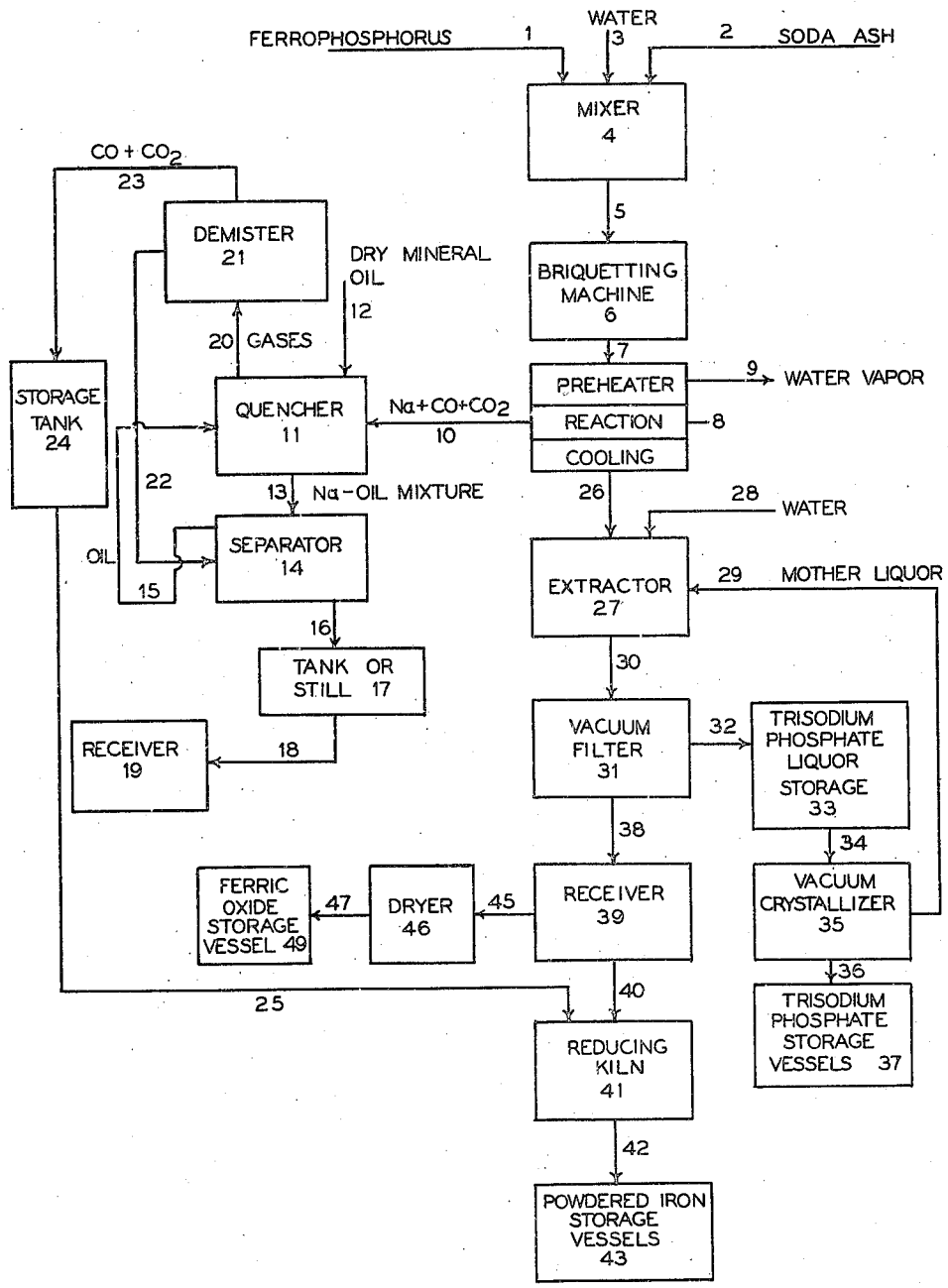

PRODUCTION OF ALKALI METALS FROM FERROPHOSPHORUS AND ALKALI CARBONATES OR HYDROXIDES

Leon E. Bowe, Anniston, Ala., assignor to Monsanto Chemical Company, St. Louis, Mo., a corporation of Delaware Application February 25, 1946, Serial No. 650,091

11 Claims. (Cl. 75—66)

This invention relates to a process for producing sodium, potassium, trialkali metal phosphates, metallic iron and iron oxide by the thermal reduction of the corresponding alkali metal carbonates by means of ferrophosphorus.

The principal object of the invention is to provide a commercially practical process for making sodium and potassium by carrying out the above reaction in a dry inert atmosphere and under reduced pressure.

An additional object is to provide a process for substantially completely eliminating phosphorus from ferrophosphorus and recovering this element in the form of trisodium or tripotassium phosphate.

Another object is to provide a process for recovering the iron content of ferrophosphorus in the form of a powdered iron product which is substantially free of oxygen and/or phosphorus.

A further object is to provide a powdered iron product containing less than 1% by weight of oxygen and phosphorus, which is admirably suitable for use in powder metallurgy.

A still further object is to provide a process for producing a ferric oxide pigment from ferrophosphorus.

Other objects will be apparent to those skilled in the art as the description proceeds.

In the past numerous methods have been proposed for reacting alkali metal compounds with ferrophosphorus to form trialkali metal phosphates, iron oxide and metallic iron, but to my knowledge no one has ever succeeded in producing metallic sodium or potassium by this reaction.

Now I have developed a commercially feasible process whereby sodium and potassium may be produced in substantially quantitative yields by thermally reducing the corresponding carbonates by means of ferrophosphorus, which process also yields trisodium or tripotassium phosphate and ferric oxide or metallic iron powder, all of which have well established commercial utility in the detergent, pigment and powder metallurgy fields respectively.

This process comprises reacting sodium or potassium carbonate with ferrophosphorus in a dry inert atmosphere under reduced pressure and at a temperature which falls substantially within the range of from about 900° C. to about 1500° C., and thereupon quickly cooling the resulting vapors to the sodium or potassium condensation temperature to separate these metals from the reaction product. In this process it is essential to use reduced pressure as carbon monoxide is a by-product of the reaction and, therefore, the alkali metal vapors must be rapidly removed from the reaction zone and quickly cooled in order to prevent substantial oxidation of these metals by the above gas.

The following equations are believed to represent the reactions taking place under the above conditions:

I: $2Na_2CO_3 + Fe_2P = Na_3PO_4 + 2Fe + 2CO + Na$
II: $4Na_2CO_3 + Fe_2P =$
$Na_3PO_4 + Fe_2O_3 + 3CO + CO_2 + 5Na$
III: $2K_2CO_3 + Fe_2P = K_3PO_4 + 2Fe + 2CO + K$
IV: $4K_2CO_3 + Fe_2P =$
$K_3PO_4 + Fe_2O_3 + 3CO + CO_2 + 5K$

Commercial ferrophosphorus is known to be a mixture of iron phosphides and in the above reactions $Fe_2P$ has been used to represent ferrophosphorus, but the reactions could have been written using $Fe_3P$, $FeP$ and $Fe_5P_3$ equally as well. In any case, the weight ratio of $Na_2O$ or $K_2O$ to phosphorus is the same whatever the phosphide used.

In carrying out the present invention, ferrophosphorus containing 10% to 30% and preferably from 22% to 26% by weight of phosphorus, is ground to a finely divided state (about 200 mesh) and then intimately mixed with water and a suitable reacting proportion of sodium carbonate or potassium carbonate. The resulting mixture is caked or briquetted and charged into a reactor where the briquettes are dried by heating. After the drying operation, the reactor is evacuated by means of a suitable pump and while under a vacuum the briquetted charge is heated to a temperature of from about 900° C. to about 1500° C. until the reaction has gone to completion. The gaseous products thus produced are rapidly removed from the reaction zone and quickly cooled to separate the sodium or potassium therefrom by condensation. This step is preferably carried out at a temperature of about 350° C. but satisfactory results are also obtained by cooling the gaseous reaction product to a temperature within the range of from about 300° C. to about 700° C.

Condensation of the metallic sodium or potassium may be achieved in any desired manner, for example, by external cooling, but it is preferably accomplished by leading the gases into a quencher where they are sprayed with a cooled mineral oil. In place of mineral oil, any liquid having a relatively low vapor pressure which differs in specific gravity and does not react with sodium may be employed.

As an alternative to the foregoing procedure, cooled non-oxidizing gases may be introduced into the gaseous reaction product in order to separate the sodium or potassium vapors by condensation. For this purpose nitrogen, hydrocarbons, hydrogen or mixtures thereof may be employed.

The volume of non-oxidizing gas required varies with the relative temperatures of the sodium or potassium vapors and the gas and may be readily calculated. The lower the temperature of the non-oxidizing gas the less of it will be required to accomplish the desired cooling effect.

Where a gas or liquid is used for cooling the gaseous reaction product in the manner described above, it should preferably have a temperature of about 20° C. to 100° C.

At the end of the reaction, the solid reaction product is leached with oxygen-free water in the presence of nitrogen or another suitable inert gas. The leached product containing metallic iron powder and trisodium (or tripotassium) phosphate is filtered on a vacuum filter connected with a source of inert gas which passes through the filter cake instead of air. The purpose of using an inert gas is to obviate oxidation of the iron powder to iron oxide. However, where iron oxide is the desired product instead of metallic iron, the leached product may be filtered without using an inert gas.

After filtering the extract, the filter cake consisting essentially of metallic iron powder is washed with oxygen-free water and the resulting extract is charged into a vacuum or another suitable crystallizer where trisodium or tripotassium phosphate is separated from its mother liquor by cooling. The mother liquor thus obtained is used directly or, after dilution with water, to leach trisodium or tripotassium phosphate from the solid ferrophosphorus reaction product obtained in the next batch.

The wet metallic powder is dried by means of a suitable oxygen-free inert gas and then treated with a reducing gas at a temperature of about 600° C. to about 1000° C. to remove oxygen and volatile impurities from the powder. If desired, these steps may be combined in a single operation, that is, the iron powder may be treated with a reducing gas at a temperature sufficient to dry and remove oxygen and volatile impurities. In general, this may be achieved at a temperature within the above range, but higher or slightly lower temperatures may be employed.

Depending upon the relative proportions of the reactants and also the reducing conditions, the powdered iron product obtained by the foregoing process will have an oxygen content of from about 0.5% to about 7.0% or more by weight and a phosphorus content of from about 0.05% to about 2.5% weight. Those products containing 1% or less of oxygen and phosphorus are highly useful in the field of powdered metallurgy.

As stated above, where ferric oxide is the desired product, it is not necessary to filter the iron powder in an inert atmosphere. The iron powder, after separation by filtering or another suitable method, is subjected to high temperature drying with air or oxygen to completely convert the iron into ferric oxide.

For a more complete understanding of the present process reference is made to the accompanying drawing which illustrates the flow sheet of the preferred embodiment of the present invention.

Finely divided ferrophosphorus, soda ash and water in suitable proportions are charged into a mixer 4 by means of pipes 1, 2 and 3 respectively. After intimate mixing, the product is transported by conveyor 5 to a briquetting machine 6 and formed into briquettes under a pressure of from 28000 to 35000 lbs. per square inch. The briquettes are conveyed by any suitable means 7 to reactor 8 where they are heated for 30 to 45 minutes at 320° C. to 400° C. to remove water therefrom, the resulting water vapor being discharged from the reactor by pipe 9.

Although the invention is not restricted thereto, reactor 8 is preferably a shaft kiln having a preheater section in which the briquettes are dried, a reaction section and a cooling section in which the reacted briquettes are cooled.

After the briquettes have been dried in the preheater section of reactor 8, they are fed into the reaction section where they are heated under a pressure of from 0.4 to 50 mm. of mercury absolute and at a temperautre of about 1000° C. until the reaction has gone to completion. In general, a heating time of about an hour is sufficient to complete the reaction.

The gaseous reaction product including metallic sodium, CO and $CO_2$ flows by way of pipe 10 into quencher 11 where the sodium is condensed and separated from the gases by contact with a dry mineral oil spray, the mineral oil for this purpose being supplied to the quencher by pipe 12.

The sodium-mineral oil mixture discharges by way of pipe 13 into separator 14 which is of sufficient volume to allow the oil and sodium to separate by gravity. The oil is drawn off continuously from the top layer and recycled by means of pipe 15 (after passing through a cooler not shown) to the quencher while the molten sodium collects in the bottom of the separator and is withdrawn by pipe 16 into a sodium storage tank or still 17. The sodium thus obtained is generally of good quality, but if greater purity is desired, it may be subjected to vacuum distillation, preferably at a temperautre of about 700° C. and the resulting sodium vapors allowed to pass into receiver 19 by pipe 18.

The gases leaving quencher 11 pass through pipe 20 into demister 21 which may be any standard unit for separating mist from gases such as a packed tower, centrifugal separator, Cottrell precipitator, etc. The oily mist separated from the gases by the demister is conveyed by pipe 22 to separator 14 where the sodium content of the mist is recovered and the remainder is combined with the mineral oil and reused in quencher 11.

After removal of the mist, the gaseous mixture is conveyed by pipe 23 into storage tank 24 from which it may be pumped by way of pipe 25 to the reducing kiln 41.

The solid sodium carbonate-ferrophosphorus reaction product, after being cooled in the cooling section of reactor 8, is discharged by pipe 26 into extractor 27 where it is leached by means of oxygen-free water and/or trisodium phosphate mother liquor, these materials being introduced by means of pipes 28 and 29 respectively. The leached product consisting essentially of metallic iron powder and trisodium phosphate solution is then conveyed by any suitable means 30 into a vacuum filter 31 where the trisodium phosphate solution is separated from the iron powder.

The trisodium phosphate solution flows by pipe 32 into a storage tank 33 from which it is discharged by pipe 34 into crystallizer 35. The trisodium phosphate separated by crystallizer 35 is dried in any suitable manner and then transported by conveyor 36 to trisodium phosphate storage vessels 37.

The trisodium phosphate mother liquor is conveyed by pipe 29 for reuse in the process in the manner above described.

The metallic iron powder separated by the vacuum filter 31 is dried in an inert atmosphere and then conveyed by any suitable means 38 to receiver 39. The powder thus obtained is in many instances of sufficient purity to be suitable for use in powder metallurgy directly, but I preferably subject the powder to treatment with a reducing gas to remove volatile impurities and oxygen.

When the preferred procedure is adopted, the iron powder is transported by conveyor 40 into reducing kiln 41 which includes a reducing section and a cooling section (not shown). The metal powder is heated to a temperature within the range of from 600° to 1000° C. and preferably at a temperature of 850° and then simultaneously or subsequently treated with a mixture of carbon dioxide and carbon monoxide, which is conveyed by means of pipe 25 from storage tank 24 into the reducing kiln 41. The treatment with the above gaseous mixture is continued until the metal powder shows no further loss in weight or until an analysis shows that the product contains less than 1% by weight of oxygen.

After cooling in the reducing kiln in the presence of an inert atmosphere, the metal powder is discharged by way of outlet 42 into storage vessels 43.

Where iron oxide is desired instead of metallic iron powder, the latter may be filtered or otherwise separated from the trisodium phosphate solution without the necessity of avoiding contact with oxygen. However, in order to be of value as a pigment, the iron powder should be completely oxidized and it is, therefore, transported by conveyor 45 to a high temperature dryer 46. After conversion to ferric oxide, the product is conveyed by any suitable means 47 to a storage vessel 49.

The following table includes a number of typical runs which illustrate in a general way the effect of varying the ratio of the reactants, the temperature of the reaction and the time of heating.

With reference to temperature variation, a comparison of runs 1, 7, and 8, using approximately the same Na2O/P weight ratio, indicates that the sodium volatilization is increased from 44% to 84% or 90%.

In runs 3, 4, 5, and 6, it will be noted that the sodium volatilization varies as follows.

30 minutes, 65%_____ Run 3
45 minutes, 69%_____ Average of runs 4 and 5
60 minutes, 80%_____ Run 6

Thus, it is evident that the sodium volatilization increases as the time of heating is increased.

(1) With further reference to the above table, it should be explained that column 10 indicates the loss in weight of the iron powder after treatment with hydrogen for two hours at 1000° C. and that this weight loss corresponds to the oxygen content of the iron powder.

(2) Columns 11 and 12 indicate the phosphorus and manganese content of the iron powder after the hydrogen treatment.

The various steps of the process will now be considered in detail.

*Preparation of briquettes*

The reactants are finely divided and intimately mixed with a small amount of water in a pug mill or another suitable mixer until a substantially homogeneous composition is obtained. This composition is briquetted and dried to remove water which, if not eliminated, will interfere with the production of sodium or potassium. In the briquetting operation, a pressure of from 28000 to 35000 lbs. per square inch is preferably employed, but it is to be understood that the invention is not restricted thereto.

*Thermal reduction of carbonates by means of ferrophosphorus*

The reaction between ferrophosphorus and the carbonates of sodium and potassium is carried out in a dry inert atmosphere under an absolute pressure of from about 0.4 mm. to about 50 mm. of mercury and at a temperature which falls substantially within the range of from about 900° C. to about 1500° C. The most satisfactory results, however, are obtained at a temperature of from 900° C. to 1000° C. and at an absolute pressure

TABLE

*Ferrophosphorus—Soda ash reaction*

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| | Charge | | | | Reaction Conditions | | | | Analyses of Metal Powder | | | | |
| Run No. | Soda Ash, g. | Ferrophos., g. | Wt. Ratio Na2O/P | Temp., °C. | Minutes | | Pressure (mm. Hg.) | | H2, Loss, Per cent | On Reduction with H2 | | Sodium Volatilized, Per cent[1] | Carbonate, Used, Per cent |
| | | | | | At Temp. | 900° C. to T. | Initial | Final | | P, Per cent | Mn, Per cent | | |
| 1 | 10.407 | 5.785 | 4.32 | 900 | 30 | ---------- | 3 | 3 | 3.67 | 2.60 | 3.76 | 44 | 79.5 |
| 2 | 13.869 | 6.502 | 5.12 | 1,000 | 30 | 16 | 3 | 4 | 0.52 | 0.35 | 4.00 | 49 | 78.4 |
| 3 | 14.109 | 6.192 | 5.47 | 1,000 | 30 | 22 | 2 | 4 | 1.00 | 0.049 | 4.00 | 65 | 84.2 |
| 4 | 14.180 | 6.491 | 5.24 | 1,000 | 45 | 29 | 2 | 3 | 5.80 | 0.15 | 4.08 | 66 | 85.5 |
| 5 | 13.824 | 6.117 | 5.42 | 1,000 | 45 | 15 | 2 | 3.5 | 4.65 | 0.14 | 3.85 | 72 | 87.3 |
| 6 | 12.646 | 5.321 | 5.70 | 1,000 | 60 | 22 | 2 | 2+ | 5.57 | 0.091 | 4.08 | 80 | 90.4 |
| 7 | 10.627 | 6.329 | 4.03 | 1,000 | 30 | 20 | 2 | 2+ | 0.54 | 2.27 | 3.84 | 84 | 95.0 |
| 8 | 11.502 | 6.854 | 4.03 | 1,000 | 30 | 25 | 3 | 3 | 0.89 | 2.21 | 3.69 | 90 | 96.8 |

[1] Per cent of Na charged which is not converted to TSP.

Thus runs 1, 8, and 7 and runs 2–6 inclusive show that if the Na2O/P weight ratio is increased from 4.03 to 4.32 to 5.12 to 5.7, the phosphorus content is reduced from 2.6% to about 0.1% or less.

of from about 0.4 to about 3 mm. of mercury.

Referring specifically to the preferred embodiment of the present invention, that is, the thermal reduction of sodium carbonate by means of ferrophosphorus, the reactants are preferably employed in a sodium carbonate/ferrophosphorus weight ratio of from 1.067 to 2.67, but higher or lower ratios may also be employed so long as the theoretical requirements are met. Considering the proportions of reactants on the basis of $Na_2O/P$ weight ratio and looking at the reaction from the standpoint of producing a substantially oxygen-free iron powder, I prefer to carry out the reaction using ferrophosphorus and sodium carbonate in a $Na_2O/P$ ratio of from about 5.3 to about 5.5. However, if maximum yields of metallic sodium are desired, the ferrophosphorus and sodium carbonate are reacted together in a $Na_2O/P$ weight ratio of from about 4.0 to 4.3. Where an iron powder which is substantially free of phosphorus is desired, the ferrophosphorus and sodium carbonate are preferably employed in a $Na_2O/P$ weight ratio of about 5.7, but if an iron powder which is substantially free of both phosphorus and oxygen is desired, these reactants are used in the proportions adapted to supply a $Na_2O/P$ weight ratio of from 5.12 to 5.47.

Sodium and potassium condensation step

In order to prevent the sodium and potassium from being oxidized by the carbon monoxide contained in the gaseous product, the sodium and potassium vapors must be rapidly removed from the reaction zone and quickly cooled to a temperature corresponding to or below the condensation temperature of these metals. Hence it is essential that the reaction be carried out under reduced pressure so that the gaseous reaction products can be removed from the reaction zone at a high velocity into a condenser where they can be rapidly cooled to the desired temperature.

Any suitable condenser may be employed for condensing the sodium and potassium so long as provision is made for preventing contact with air, oxygen or other oxidizing gases or compounds. However, I prefer to use a quencher in which a cooled mineral oil, such as kerosene, is sprayed into the gaseous reaction product to cool it to the required temperature. I may also condense the sodium or potassium from the gaseous reaction product by injecting therein cold non-oxidizing gases such as hydrogen, nitrogen, hydrocarbon gases and mixtures thereof.

Reduction of iron powder

When this precedure is employed to further reduce the oxygen content of the iron powder, it is carried out at elevated temperatures using a reducing gas such as hydrogen, a mixture of carbon monoxide and carbon dioxide, methane, other hydrocarbon gases and mixtures of carbonaceous reducing gases or hydrogen with nitrogen or another suitable inert gas.

The optimum temperature for the reduction reaction varies with the reducing gas selected, but generally I employ a temperature which falls substantially within the range of from 600° C. to 1000° C.

A mixture of carbon monoxide and carbon dioxide is the preferred reducing gas and when it is used, the temperature of the reaction should be maintained substantially within the range of from 700° C. to 850° C. and the gases should be mixed in a $CO_2/CO$ volume ratio of about 0.1 to about 0.6. Moreover, it is desirable to correlate the temperature with the $CO_2/CO$ volume ratio in order to avoid substantial carburization of the iron powder, and, therefore, the ratio should vary inversely with the temperature.

When hydrogen is employed as the reducing gas, a temperature of 1000° C. and a reaction time of two hours are preferred, but these factors may fluctuate considerably without departing from the spirit of the invention.

In general, the reaction times varies with the reducing gas and also with the reaction temperature; the higher the temperature the shorter the heating time and vice versa.

Iron powder drying step

Where iron powder which is substantially free of oxygen is desired, it is essential to dry the iron powder by means of nitrogen or another suitable inert gas. This, however, is not necessary if the iron powder is to be reduced or ultimately converted into ferric oxide.

Extraction step

Where it is desired to obtain metallic iron powder which is substantially free of oxygen without resorting to the reduction step, it is essential to use oxygen-free water and to carry out the extraction step in an inert atmosphere. However, when the reduction step is to be used or when ferric oxide is the desired product, it is not necessary to adhere to the above conditions.

Filtering step

As in the case of the extraction operation, this step must be carried out in an inert atmosphere if it is desired to avoid the reduction step and at the same time obtain a substantially oxygen-free iron powder. The preferred method for executing this step is to subject the extracted product to vacuum filtration, the vacuum filter being connected to a source of nitrogen or another suitable inert gas whereby the latter is permitted to pass through the filter cake instead of air.

The above precautions, however, are not necessary where the reduction step is subsequently employed or where ferric oxide is the desired product.

Conversion of iron powder to ferric oxide

This step of the process merely involves drying the iron powder at an elevated temperature in the presence of air or oxygen and it may be carried out in any suitable manner known to the art.

Recovery of trisodium and tripotassium phosphate from the corresponding extracts This operation merely consists in crystallizing the trisodium or tripotassium phosphate by cooling or vacuum evaporation and then separating the crystals by filtration, centrifuging, etc. There is nothing novel or critical about these steps and so they may be carried out in any manner known to those skilled in the art.

The foregoing description has been directed to the thermal reduction of sodium and potassium carbonate by means of ferrophosphorus, but it is to be understood that that invention is not restricted thereto as the hydroxides of sodium and potassium may also be used. The reactions which take place in the thermal reduction of the sodium and potassium hydroxide by ferrophosphorus are believed to be represented by the following equations:

I. $4NaOH + Fe_2P = Na_3PO_4 + 2Fe + 2H_2 + Na$
II. $7NaOH + Fe_2P = Na_3PO_4 + Fe_2O_3 + 3.5H_2 + 4Na$
III. $4KOH + Fe_2P = K_3PO_4 + 2Fe + 2H_2 + K$
IV. $7KOH + Fe_2P = K_3PO_4 + Fe_2O_3 + 3.5H_2 + 4K$

As in the case of the carbonates, the reaction between the hydroxides of potassium or sodium and ferrophosphorus is carried out in a dry inert atmosphere and at a temperature substantially within the range of from about 900° C. to about 1500° C. The reaction may also be executed under reduced pressure, that is, under an absolute pressure of from about 0.4 mm. to about 50 mm. of mercury, but this is not essential to efficient operation. Contrary to the carbonate-ferrophosphorus reaction, atmospheric pressure may be employed in this embodiment of the invention since carbon monoxide is not a by-product and, therefore, it is not necessary to rapidly remove the sodium and potassium vapors from the reaction zone so that they can be quickly cooled to avoid substantial oxidation to the corresponding oxides.

In the ferrophosphorus-hydroxide reaction the sodium and potassium hydroxides melt before reaching the reaction temperature and consequently the reactor must be equipped with a suitable agitator to insure intimate contact between the reactants. Moreover, it is essential that the reaction be carried out in a dry inert atmosphere at a temperature within the above range and that the alkali metals produced be condensed in a non-oxidizing atmosphere.

While I have described my invention in detail, it should be understood that many changes may be made without departing from the spirit thereof.

What I claim is:

1. The process which comprises reacting at a temperature of about 900° C. to about 1500° C. a compound selected from the group consisting of carbonates and hydroxides of sodium and potassium with at least the theoretical amount of ferrophosphorus required to yield the corresponding alkali metal and condensing the resulting alkali metal vapor by cooling, said reaction being carried out in a dry inert atmosphere and under an absolute pressure of from about 0.4 mm. to about 50 mm. of mercury.

2. The process defined in claim 1 wherein the reaction is carried out under an absolute pressure of from about 0.4 mm. to about 3 mm. of mercury.

3. The process defined in claim 1 wherein the reaction is carried out at a temperature of about 900° C. to about 1000° C.

4. The process defined in claim 1 wherein the reaction is carried out under an absolute pressure of from about 0.4 mm. to about 3 mm. of mercury and at a temperature of about 900° C. to about 1000° C.

5. The process which comprises reacting at a temperature of about 900° C. to about 1500° C. a briquetted mixture of sodium carbonate and ferrophosphorus in the proportions calculated to provide a $Na_2O/P$ weight ratio of about 5.1 to about 5.5 and thereby producing metallic sodium, powdered iron and trisodium phosphate and cooling the resulting metallic sodium vapor to at least the sodium condensation temperature to condense said metallic sodium, said reaction being carried out in a dry inert atmosphere and under an absolute pressure of from about 0.4 mm. to about 50 mm. of mercury.

6. The process defined in claim 5 wherein the reaction is carried out at a temperature of about 900° C. to about 1000° C.

7. The process defined in claim 5 wherein the reaction is carried out at a temperature of about 900° C. to about 1000° C. and under an absolute pressure of from about 0.4 mm. to about 3 mm. of mercury.

8. The process which comprises reacting together at a temperature of from about 900° to about 1500° C. a briquetted mixture of sodium carbonate and ferrophosphorus in the proportions calculated to provide a $Na_2O/P$ weight ratio of about 4 to about 10 and thereby producing metallic sodium and rapidly cooling the resulting gaseous product to at least the sodium condensation temperature to condense said metallic sodium, said reaction being carried out in a dry inert atmosphere and under an absolute pressure of from about 0.4 mm. to about 50 mm. of mercury.

9. The process which comprises reacting at a temperature of about 900° C. to about 1500° C. a briquetted mixture of sodium carbonate and ferrophosphorus in the proportions calculated to provide a $Na_2O/P$ weight ratio of about 4 to about 5.7 and thereby producing metallic sodium vapor, and rapidly cooling said vapor to the sodium condensation temperature to condense said metallic sodium, said reaction being carried out in a dry inert atmosphere and under an absolute pressure of from about 0.4 mm. to about 50 mm. of mercury.

10. The process which comprises reacting at a temperature of about 900° C. to about 1500° C. a briquetted mixture of sodium carbonate and ferrophosphorus in the proportions calculated to provide a $Na_2O/P$ weight ratio of about 4.0 to about 4.3 and thereby producing metallic sodium vapor, and rapidly cooling said vapor to at least the sodium condensation temperature to condense said metallic sodium, said reaction being carried out in a dry inert atmosphere and under an absolute pressure of from about 0.4 mm. to about 50 mm. of mercury.

11. The process which comprises reacting at a temperature of about 900° C. to about 1500° C. a briquetted mixture of sodium carbonate and ferrophosphorus in the proportions calculated to provide a $Na_2O/P$ weight ratio of about 5.1 to 5.5 and thereby producing metallic sodium, powdered iron and trisodium phosphate and recovering at least one of said products, said reaction being carried out in a dry inert atmosphere and under an absolute pressure of from about 0.4 mm. to about 50 mm. of mercury.

LEON E. BOWE.

REFERENCES CITED

The following references are of record in the file of this patent:

UNITED STATES PATENTS

| Number | Name | Date |
|---|---|---|
| 1,837,935 | Ylla-Conte | Dec. 22, 1931 |
| 1,888,003 | Lindberg | Nov. 15, 1932 |
| 1,939,305 | Klein | Dec. 12, 1933 |
| 2,391,728 | McConica | Dec. 25, 1945 |

FOREIGN PATENTS

| Number | Country | Date |
|---|---|---|
| 338,409 | Great Britain | Nov. 20, 1930 |